March 15, 1927.
G. P. HAWES, JR
1,621,251
DRAIN PLUG OR VALVE FOR CONTAINERS
Filed Nov. 4, 1922
2 Sheets-Sheet 1
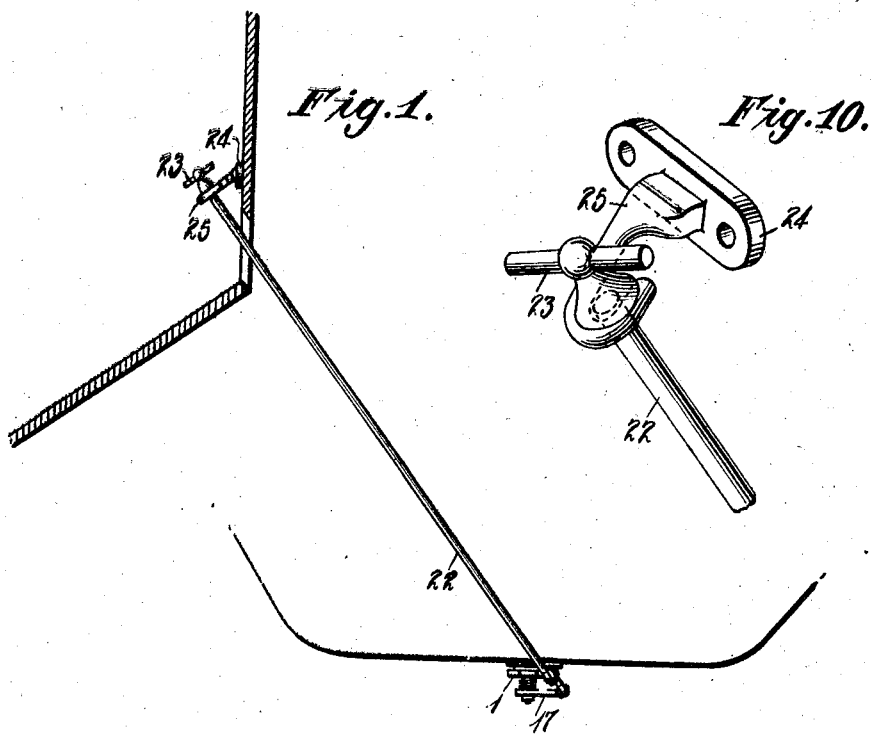
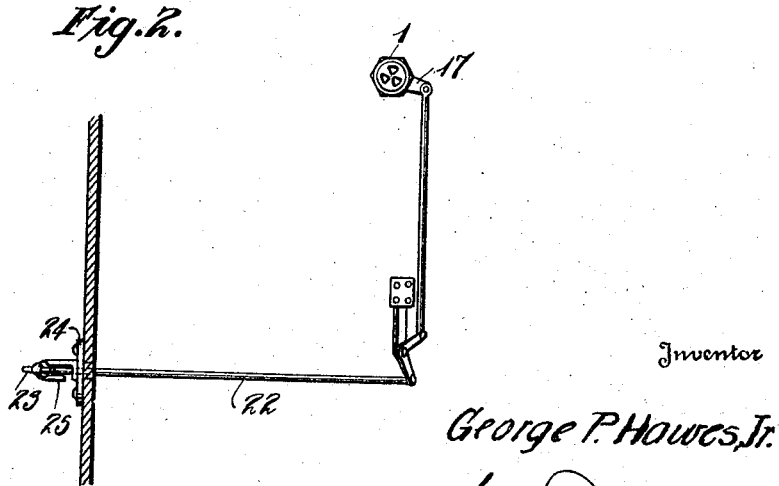
Inventor
George P. Howes, Jr.
By Wm. F. Tayle
Attorney March 15, 1927.
G. P. HAWES, JR
1,621,251
DRAIN PLUG OR VALVE FOR CONTAINERS
Filed Nov. 4, 1922    2 Sheets-Sheet 2
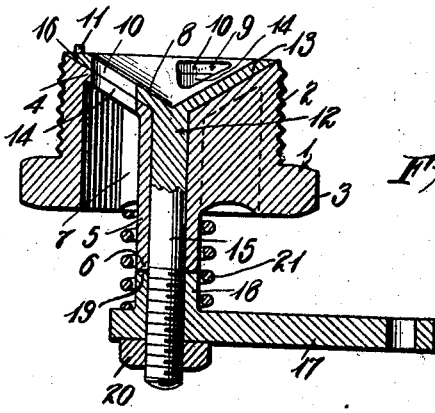
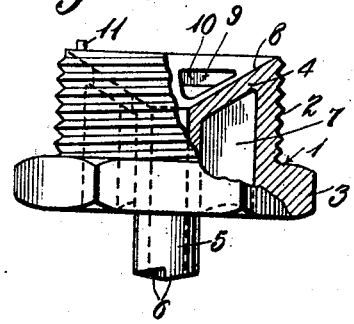
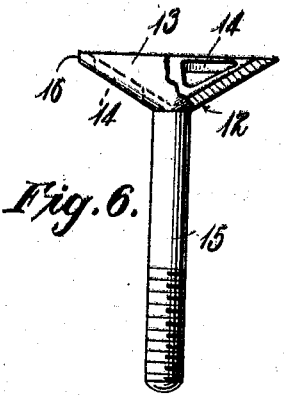
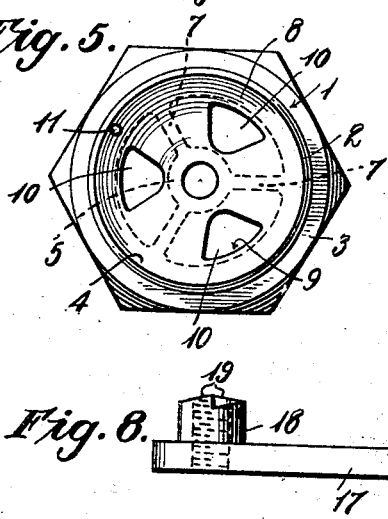
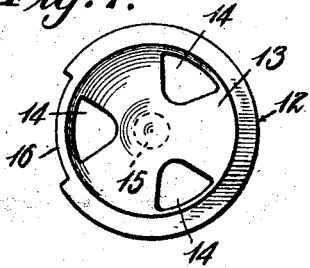
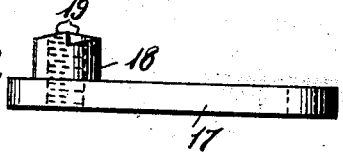
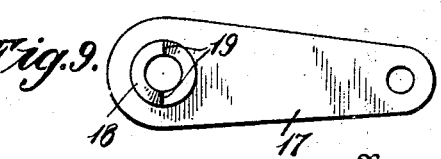
Inventor
George P. Hawes, Jr.
By
Attorney Patented Mar. 15, 1927.

1,621,251

UNITED STATES PATENT OFFICE.

GEORGE P. HAWES, JR., OF THE UNITED STATES ARMY, FORT McPHERSON, GEORGIA.

DRAIN PLUG OR VALVE FOR CONTAINERS.

Application filed November 4, 1922. Serial No. 599,153.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment of any royalty thereon.

This invention relates to an improved drain plug or valve for containers, more particularly for use in draining liquid containers such as engine oil pans, crank cases, etc., and may be produced as an article of manufacture to be applied to any one of the several forms of engines using the splash feed lubricating system.

The crank case of the type of motor above mentioned contains a quantity of free oil into which the lower bearings of the piston links dip for lubrication, said oil after being in use for a limited time must be drained off and replaced by fresh oil. Ordinarily the operator must crawl almost entirely beneath his car when the engine is used as a vehicle motor. This entails considerable annoyance, especially to a large man, his clothing is necessarily soiled and the discharge of oil when the valve is opened soils his hands, and in many instances, runs up the sleeve of the operator.

It is therefore the purpose of this invention to provide means for draining, for instance, the crank case of an engine, in a clean, expeditious manner, consisting of a highly efficient valve having operating means remote therefrom that may be located in any preferred position for the greatest convenience, such as on the dash, where the device may be operated without leaving the seat of the vehicle.

The objects are to provide a simple, durable and inexpensive device of a character that may be applied to any of a variety of engines.

A further object is to provide means whereby a motor operator may drive into a service station, discharge the objectional oil in his crank case, have his crank case recharged by fresh oil, which is done by the service station attendant, and drive out without leaving his seat in the vehicle.

A further object is to provide means whereby time will be saved, the destruction to clothing prevented, and the expense to the owner of a car of paying or tipping those who must ordinarily perform this work of draining the pan or crank case of his engine for him. This and other objects will appear in the following description and be finally pointed out in the appended claims.

A further object is to provide means whereby the valve is firmly clamped against its seat when closed, and also means for holding said clamping means to insure against possible leakage past the valve or displacement of the parts due to vibration.

A further object is to provide means whereby the wear of the valve and valve seat may be taken up in such a manner as to provide for firmly closing the valve by an operation of the clamping lever through an arc corresponding to that traversed prior to the adjustment.

Similar numerals indicate corresponding parts in all the figures of the drawings in which:

Fig. 1 is a side elevation of my improved crank case draining mechanism as applied to an automobile, parts only of the latter being shown.

Fig. 2 is a plan view of same.

Fig. 3 is an enlarged detailed section of the drain plug or valve, assembled.

Fig. 4 is a side elevation partly in section of the valve body.

Fig. 5 is an end view of the valve body and seat.

Fig. 6 is a side view partly in section of the valve.

Fig. 7 is an end view of the valve.

Fig. 8 is a side view of the operating arm.

Fig. 9 is a face view of the operating arm.

Fig. 10 is a view on an enlarged scale to more fully illustrate the clamping mechanism for the valve that is mounted in this instance on the dash of the vehicle.

Referring to the drawings by numerals, the valve body 1 is exteriorly screw threaded as shown at 2, and is provided with a wrench engageable portion 3. The body portion is preferably hollow and is provided with a frusto-conical diaphragm 4, which extends inwardly from one end of the body and provides the valve seat. Extending from the inner central portion of the diaphragm 4 is a valve stem sleeve 5, extending slightly beyond the end of the body portion and provided at its outer end with cam faces 6. Spider arms 7 connect and support the parts of the valve body.

The outer face of the conical diaphragm forms the valve seat 8, and is provided with openings 9, of any preferred form but of an aggregate area slightly less than one-half of the valve surface.

In the form shown three approximately triangular openings 10 are arranged with solid spaces therebetween of slightly greater area than the openings. The body portion is further provided with a stop pin or shoulder 11, projecting from the body portion outside of the valve seat.

The valve 12 is provided with the frusto-conical head 13, corresponding with the valve seat in the body and has openings 14 and spaces between, that correspond with the openings and spaces in the valve seat. The valve stem 15 is screw threaded at its outer end for the reception of a valve operating arm and a lock nut. The outer edge of the valve head 13 is provided with a cut away portion 16, adapted to cooperate with the stop pin 11, to limit the movement of rotation of the valve in both directions.

The operating arm 17 consists of a lever provided with a screw threaded sleeve 18, mounted securely on or forming an integral part of said arm, said sleeve being provided at its outer end with cam portions 19, corresponding with and adapted to operate in conjunction with the cam surfaces 6, at the end of the valve stem sleeve to provide for firmly drawing the valve down on its seat when the valve is closed.

The lock nut 20, threaded on the valve stem, is adapted to retain the operating arm in its adjusted position on the valve stem.

A coil compression spring 21, encircling the valve stem sleeve and resting at one end on the spider arms of the body and at its outer end against the under or inner face of the operating arm, tends to keep the valve firmly in contact with its seat when the valve is open.

The valve operating rod 22 is connected with the outer or swinging end of the valve operating arm at one end and passes through the dash of the vehicle and is provided with a handle or grip 23, at its extreme end.

A retaining bracket 24, preferably mounted on the dash of the vehicle, is provided with a plate 25, in which a bayonet slot is provided for the reception of the valve operating rod which may be inserted therein after the valve is pulled firmly shut.

The handle or grip at its base is preferably provided with a shoulder which is brought into contact with the edges of the slot in the lock plate and prevents any retrograde movement of the parts, whereby the valve is held clamped in its closed position and the tension on the parts provides against any objectionable vibration.

The stop pin 11, projecting from the body portion of the valve seat, is adapted to operate in a cut-away portion of the outer edge of the valve, said cut-away portion of the valve forming shoulders at its ends which present stopping points for the valve, both in its open and closed positions.

In view of the above arrangement and the connections for operating this valve, the arm 17 must necessarily swing through a given arc and any adjustment that is made must be made independent of the swing of said operating lever and the valve, and is accomplished by an adjustment of the valve body in the crank case, which brings the cams at the end of the valve stem sleeve into the proper position to lower the valve and clamp it against its seat with the valve closed, the stop pin stopping the valve in said position.

In operation, the crank case is drilled and screw threaded for the reception of the body portion of the drain plug, the operating rod is connected to the outer end of the operating lever and is extended up and through the dash of the vehicle within easy reach of the operator. The normal position of the valve is closed with the grip at the remote end of the rod firmly caught in the bayonet slot of the retaining bracket. To drain the crank case of its oil it is only necessary to disconnect the upper end of the operating rod from the retaining bracket and push the rod slightly downward which will provide approximately a one-third rotation of the valve on its seat to bring the blank surfaces and the openings in the valve in alignment with the corresponding portions of the diaphragm, which will permit the free outflow of the liquid contents of the crank case.

Due to the formation of the cam surfaces on the outer end of the valve stem sleeve and the tubular extension at the inner end of the operating lever, when the valve is open, the valve is retained on its seat in a relatively loose manner, the compression spring being the only pressure then exerted to hold the valve against its seat. When, however, the operating rod is drawn to close the valve the above mentioned cam surfaces so operate one upon another that the valve is drawn firmly down against the seat to prevent any possible leakage.

When the valve becomes worn it is necessary simply to loosen the lock nut that retains the operating lever in place on the valve stem and by slightly adjusting the body portion of the valve in a rotary direction and adjusting the operating lever on the valve stem, said wear will be taken up and the lever will operate in the same relative position, or the same arc, as it did prior to said adjustment.

Having thus described my invention, what I claim as new and desire to secure by Letters Patent is:

1. The combination with a motor vehicle, of a crank case draining apparatus, consisting of a valve member adapted to be mounted in the lower portion of the crank case of the motor, having a body portion exteriorly screw threaded, a frusto-conical valve seat extending inwardly from one end of the body portion and provided with openings, a sleeve for the reception of a valve stem having cam surfaces at its end, a valve having a frusto-conical head and openings, corresponding with the valve seat, and a stem extending through and beyond the sleeve, a valve operating lever having a tubular extension screw threaded for adjustment on the valve stem and having cam surfaces adapted to operate against the cam surfaces of the sleeve, to clamp the valve in its closed position, a compression spring between the valve body and the lever, operating means connected at one end and adapted to operate the lever, said operating means extending through the dash of the vehicle, a handle having an enlarged base portion secured at the end of the operating means, and a bracket mounted on the dash and provided with a bayonet slot through which said operating means extend and are secured, to retain said valve in its closed and clamped position.

2. A drain for containers, consisting of a valve, means for operating the valve, means for clamping the valve to its seat, only when closed, and means for holding the valve operating means when valve is closed.

3. A drain for containers, consisting of a valve, having a conical valve seat and head, means for operating the valve, means for clamping the valve to its seat, only when closed, and means for holding the valve-operating means when the valve is closed.

4. A drain for containers, consisting of a valve, having a body portion and frusto conical valve seat extending inwardly from one end, means for operating the valve, means for clamping the valve to its seat, only when closed, and means for holding the operating means when valve is closed.

5. A drain for containers, consisting of a valve, having a body portion, a frusto-conical valve seat extending inwardly from one end, a valve stem sleeve projecting from its opposite end, means for operating the valve, means for clamping the valve to its seat, only when closed, and means for holding the valve operating means when the valve is closed.

6. A drain for containers, consisting of a valve, having a body portion, a valve having a stem, a sleeve in the body for the reception of said stem, valve operating means mounted on said stem, and means for holding the valve operating means and the valve when closed.

7. A drain for containers, consisting of a valve, having a body portion, a sleeve for the reception of the valve stem and a frusto-conical valve seat extending inwardly from one end, a valve stem sleeve projecting from its opposite end, means for operating the valve, means for clamping the valve to its seat, only when closed, and means for holding the valve operating means when the valve is closed.

8. A drain for containers, consisting of a valve, having a body portion and a frusto-conical valve seat, a valve having a stem, an arm mounted on the valve stem for rotating same, means for clamping the valve to its seat, only when closed, and means for holding the operating means when the valve is closed.

9. A drain for containers, consisting of a valve, having a body portion and a stem, means for providing rotary and longitudinal movement of the valve, means for clamping the valve to its seat only when closed and means for holding the operating means when the valve is closed.

10. A drain for containers, consisting of a valve, having a frusto-conical valve seat extending inwardly from one end and provided with a plurality of openings, a valve stem sleeve provided with cam surfaces at its end, a frusto-conical valve provided with a plurality of openings to correspond with the openings in the valve seat, and a valve stem extending through and beyond the sleeve, an arm adjustably mounted on the valve stem provided with a collar having cam surfaces for cooperation with the cam surfaces on the sleeve, and means for operating the arm and holding said operating means.

11. A device of the class described, consisting of a valve, means for rigidly clamping the valve head against its seat only when closed, means for operating the valve from a remote point, and means for holding the valve operating means when the valve is closed.

12. A device of the class described, consisting of a valve, means for flexibly retaining the valve against its seat when open, means for rigidly clamping the valve against its seat when closed, means for operating the valve from a remote point, and means for holding the valve operating means when the valve is closed.

13. A device of the class described, consisting of a valve, means for flexibly retaining the valve against the seat when open, adjustable means for rigidly clamping the valve against the seat when closed, means for operating the valve from a remote point, and means for holding the valve operating means when the valve is closed.

GEORGE P. HAWES, Jr.